(12) United States Patent
Louie et al.

(10) Patent No.: US 9,707,705 B2
(45) Date of Patent: Jul. 18, 2017

(54) VACUUM BAG PROCESSING OF COMPOSITE PARTS USING A CONFORMABLE VACUUM BAG ASSEMBLY

(71) Applicant: The Boeing Company, Chicago, IL (US)

(72) Inventors: Michael K. Louie, Renton, WA (US); Kenneth M. Dull, Puyallup, WA (US); Timothy David Aquino, Olympia, WA (US); Phillip Keller Lathrop, Graham, WA (US)

(73) Assignee: THE BOEING COMPANY, Chicago, IL (US)

( * ) Notice: Subject to any disclaimer, the term of this patent is extended or adjusted under 35 U.S.C. 154(b) by 851 days.

(21) Appl. No.: 13/933,368

(22) Filed: Jul. 2, 2013

(65) Prior Publication Data

US 2015/0008624 A1    Jan. 8, 2015

(51) Int. Cl.
| | | |
|---|---|---|
| *B29C 33/10* | (2006.01) | |
| *B29C 70/34* | (2006.01) | |
| *B29C 70/44* | (2006.01) | |
| *B29C 37/00* | (2006.01) | |
| *B29C 43/36* | (2006.01) | |

(52) U.S. Cl.
CPC .......... *B29C 33/10* (2013.01); *B29C 37/0064* (2013.01); *B29C 43/3642* (2013.01); *B29C 70/342* (2013.01); *B29C 70/443* (2013.01)

(58) Field of Classification Search
CPC ... B29C 43/3642; B29C 70/342; B29C 33/10; B29C 37/0064; B29C 70/443; B29C 33/405

See application file for complete search history.

(56) References Cited

U.S. PATENT DOCUMENTS

| | | | | |
|---|---|---|---|---|
| 4,548,859 A | * | 10/1985 | Kline | ................... B29C 37/006 427/243 |
| 2011/0110612 A1 | * | 5/2011 | Nelson | ................... B29C 70/54 383/42 |
| 2013/0126386 A1 | | 5/2013 | Dull | |

FOREIGN PATENT DOCUMENTS

| | | |
|---|---|---|
| WO | 2005053939 A1 | 6/2005 |
| WO | WO2005118264 A1 | 12/2005 |
| WO | 2009118695 A1 | 10/2009 |

OTHER PUBLICATIONS

Canadian Intellectual Property Office Examination Search Report, dated Jul. 24, 2015, regarding Application No. 2,852,755, 3 pages.
Extended European Search Report, dated Nov. 7, 2014, regarding Application No. EP14175366.5, 8 pages.

* cited by examiner

*Primary Examiner* — Robert J Grun
(74) *Attorney, Agent, or Firm* — Yee & Associates, P.C.

(57) ABSTRACT

A vacuum bag assembly is used to process the composite part. The vacuum bag assembly includes a stretchable vacuum bag attached to a stretchable breather.

21 Claims, 9 Drawing Sheets

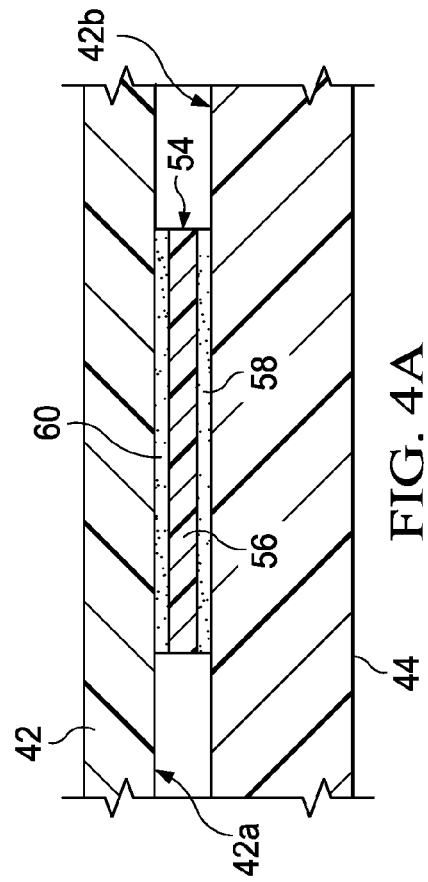
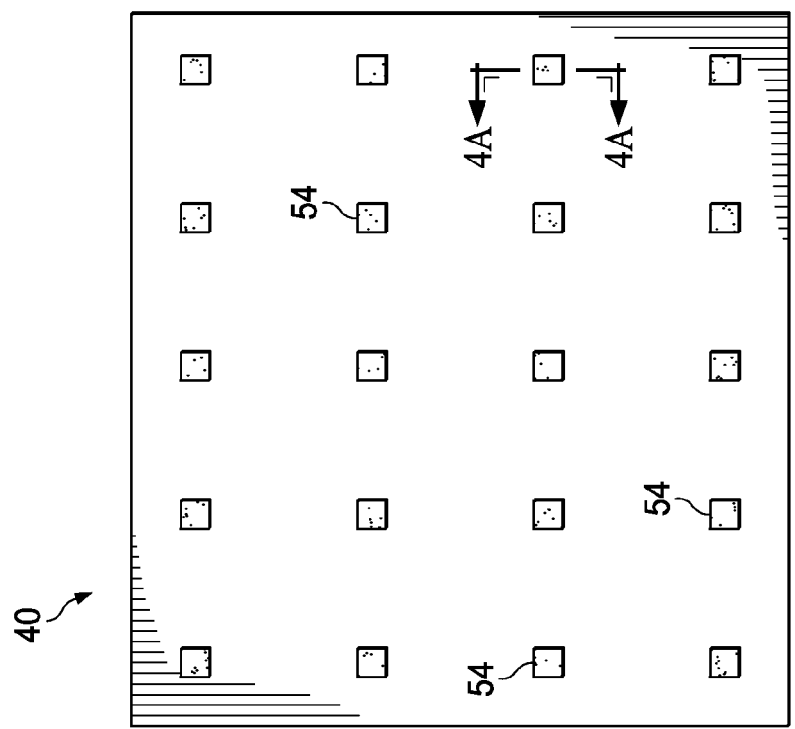

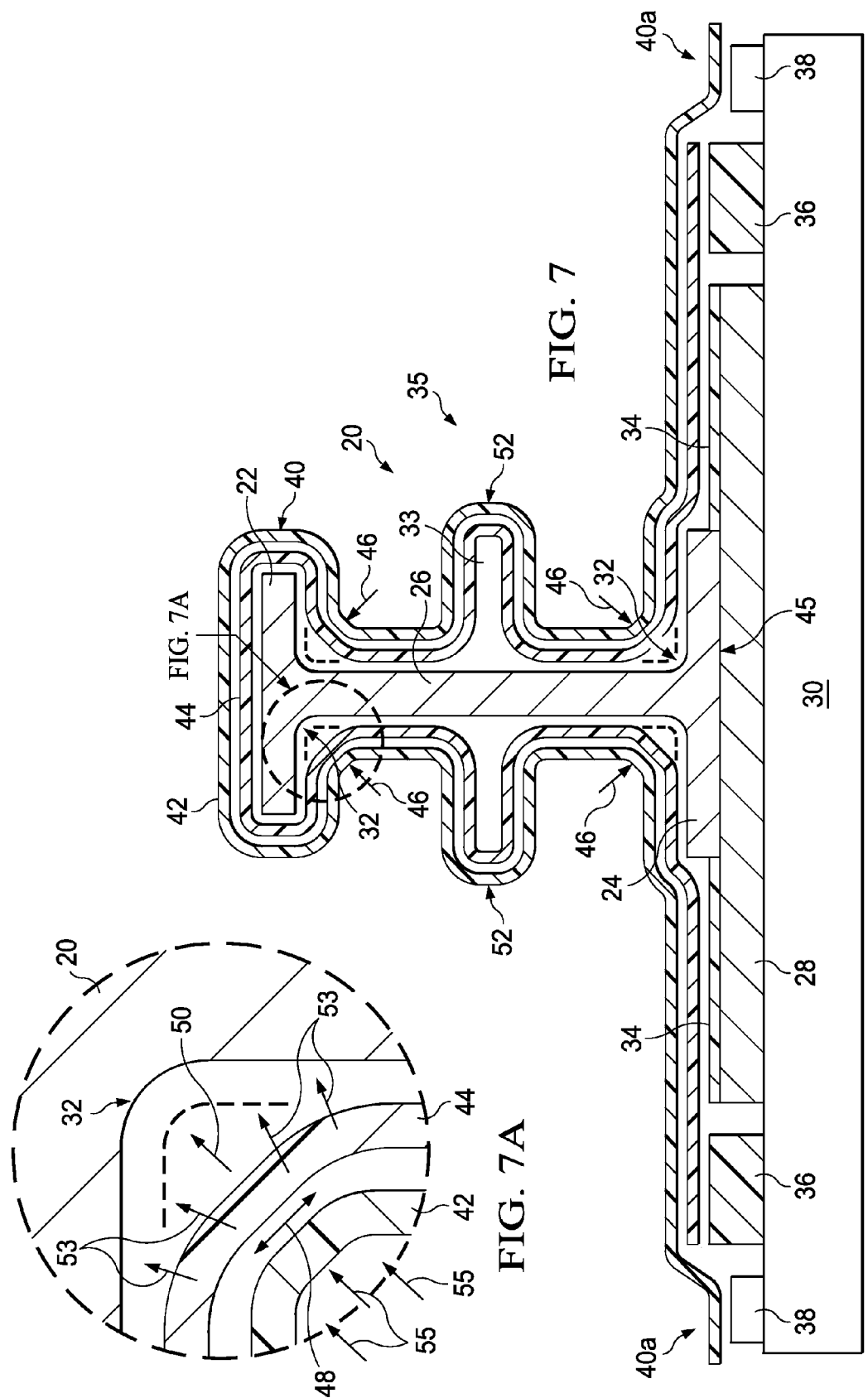

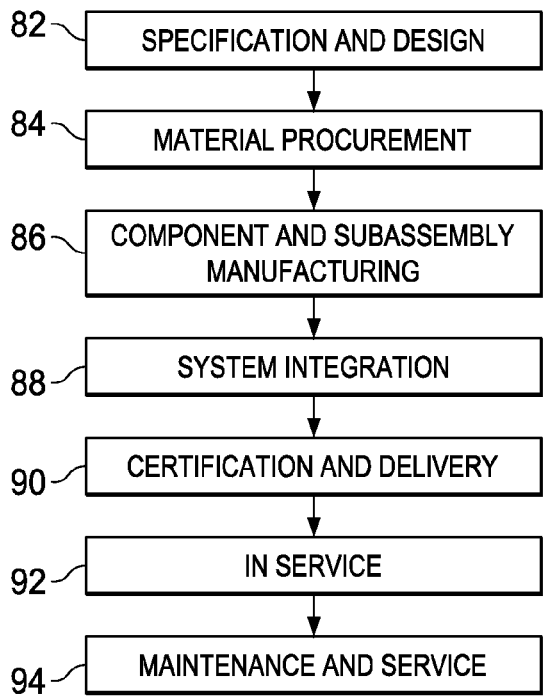
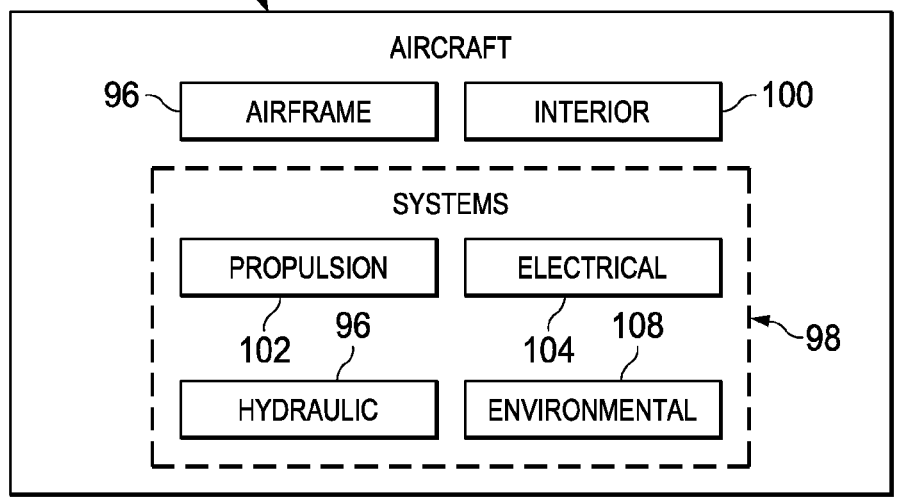

VACUUM BAG PROCESSING OF COMPOSITE PARTS USING A CONFORMABLE VACUUM BAG ASSEMBLY

BACKGROUND INFORMATION

1. Field

The present disclosure generally relates to vacuum bag processing of composite parts, and deals more particularly with a vacuum bagging method using a stretchable vacuum bag assembly that conforms to contoured surfaces of the parts.

2. Background

Composite laminate parts may be cured using autoclave or out-of-autoclave processes. These processes typically employ a combination of heat and pressure applied by a vacuum bag to compact and consolidate the part. A breather may be placed between the part and the vacuum bag in order to allow escape of air and volatiles from the laminate, and thereby avoid undesired entrapment of these gases.

Curing composite laminate parts and adhesives using the processes mentioned above presents a number of challenges where a part has certain geometries and/or surface contours such as inside radii. For example, breathers may have difficulty in conforming to an inside radius on the part, resulting in what is commonly referred to as "bridging", in which the breather and overlying vacuum bag bridge over the area of the radius. Bridging may have the undesired effect of reducing the local compaction pressure that is applied to the part. One partial solution to the problem of bridging, is to apply the breather in multiple pieces that are individually hand-placed around a surface contour where bridging may occur. Alternatively, the use of breather material in contoured part areas may be completely avoided, however the absence of a breather in these areas may limit the ability of air and volatiles to escape from the laminate. Multiple piece breathers are labor intensive to cut and install, and result in material scrap. In some applications, the lack of a breather in areas of the part where bridging is probable may result in inadequate breathing of these areas.

Another challenge presented in vacuum bag processing of parts with certain geometries involves the placement and positioning of the vacuum bag over the breather. During the bagging process, bulk vacuum bag material is draped over the part and is loosely hand fitted to the general geometry of the part. The bagging process usually results in local accumulations of excess bag material in some areas of the part. This excess bag material is gathered together and hand formed into pleats. It is often necessary to meticulously form these pleats at precise locations on the part in order to reduce bridging of breather materials during curing. For example, in the case of a part having multiple inside radii, a pleat in the bag material must be hand formed at the exact location of each of these radii. The presence of a bag pleat at a radius area allows the bag to expand into the radius and maintain compaction pressure in the radius area. However, the need to hand form each pleat in the bag material is time consuming and labor intensive. Moreover, the use of a bag pleat in a radiused area of the part may not reduce bridging of the breather material to the desired extent.

Accordingly, there is a need for a method of vacuum bag processing contoured composite laminate parts that reduces or eliminates undesired bridging of vacuum bag materials, and reduces labor and material costs. There is also a need for a vacuum bag assembly that is capable of conforming to surface contours, such as an inside radius of a part, and which may be quickly and easily installed.

SUMMARY

The disclosed embodiments provide a method of vacuum bag processing composite laminate parts which reduces bagging time, bag handling, labor costs and material scrap. The embodiments employ a vacuum bag assembly that may be quickly and easily deployed and loosely fitted over a part. Hand formation of bag pleats at precise locations on the part is substantially eliminated; instead, any bag pleats that may be needed can be formed at any convenient location on the part. The vacuum bag assembly employs a stretchable vacuum bag attached to a one-piece, stretchable breather that is substantially coextensive with the vacuum bag. The use of a one-piece breather allows all areas of the part to be covered with breather material, thus eliminating the need for cutting and hand placement of individual breather elements. When autoclave and vacuum bag pressure are applied along with heat during curing, the breather stretches and conforms to surface features of the part, such as inside radii. The ability of the breather to stretch substantially reduces or eliminates breather bridging that can result in gaps and related low pressure areas beneath the vacuum bag.

According to one disclosed embodiment, a method is provided of vacuum bag processing a composite part having at least one contour. The method comprises forming a vacuum bag assembly by attaching a stretchable breather to a stretchable vacuum bag, and sealing the vacuum bag assembly over the composite part. The vacuum bag assembly is stretched to substantially match the contour of the composite part. The breather may be attached to the vacuum bag at spaced apart locations over the vacuum bag assembly. The attachment process can be performed by placing double-backed adhesive tape between the breather and the vacuum bag. Stretching the vacuum bag assembly includes stretching the vacuum bag, and stretching the breather. Stretching the vacuum bag and stretching the breather may be performed substantially simultaneously. Stretching the breather includes stretching the vacuum bag substantially the same amount that the breather is stretched. Stretching the vacuum bag assembly is performed by drawing a vacuum in the vacuum bag, and using the vacuum to stretch the breather. The stretching step may also include using autoclave pressure to stretch the vacuum bag against the breather. The method may further comprise forming at least one pleat the vacuum bag assembly.

According to a further disclosed embodiment, a method is provided of autoclave curing a composite laminate part having at least one inside radius surface. A stretchable breather is placed over the composite laminate part, and a stretchable vacuum bag is placed over the stretchable breather. The stretchable vacuum bag is sealed over the composite laminate part, and the breather is stretched down against, and conforms to the inside radius surface. Placing the breather may be performed by covering substantially the entire part with a single sheet of breather material. The method may also comprise attaching the breather to the vacuum bag before the vacuum bag is sealed over the part. The breather may be attached to the vacuum bag by placing adhesive strips between the breather and the vacuum bag. The method may further comprise forming at least one pleat in the combination of the breather and the vacuum bag at a location other than at the one inside radius surface. Sealing the vacuum bag may be performed by sealing the vacuum bag to a tool on which the part is supported. Stretching the vacuum bag may be performed by evacuating the vacuum bag, and applying autoclave pressure to the vacuum bag.

According to still further disclosed embodiment, a method is provided of vacuum bagging a part having a contour. The method comprises combining a stretchable vacuum bag with a stretchable breather, and stretching the combination of the stretchable vacuum bag and the stretchable breather to substantially match the contour of the part. The combining of the bag and the breather is performed by attaching the vacuum bag to the breather. Attaching the vacuum bag to the breather may be carried out by placing strips of double-backed adhesive tape between the vacuum bag and the breather. The stretching is performed by drawing a vacuum in the vacuum bag, and applying autoclave pressure to the vacuum bag.

According to another disclosed embodiment, a vacuum bag assembly is provided comprising a stretchable vacuum bag, and a stretchable breather attached to the stretchable vacuum bag. The breather is a substantially single piece of breather material and is substantially coextensive with the vacuum bag. The breather may be attached to the vacuum bag by an adhesive, and may comprise a relatively light weight, nonwoven material. The nonwoven material may be a polyester. The stretchable breather is capable of elongation of at least approximately 50%, and is porous.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and advantages thereof, will best be understood by reference to the following detailed description of an illustrative embodiment of the present disclosure when read in conjunction with the accompanying drawings, wherein:

FIG. 4 is an illustration of a plan view of the embodiments of the stretchable vacuum bag assembly shown in FIG. 3.

FIG. 4A is an illustration of a sectional view taken along the line 4A-4A in FIG. 4.

FIG. 7 is an illustration similar to FIG. 2, but showing the vacuum bag assembly having been loosely fitted over the stringer and skin and sealed to the tool.

FIG. 7A is an illustration of the area designated as FIG. 7A in FIG. 7, the stretched position of the breather being indicated in broken lines.

FIG. 10 is an illustration of a flow diagram of aircraft production and service methodology.

FIG. 11 is an illustration of a block diagram of an aircraft.

DETAILED DESCRIPTION

Figure 1:
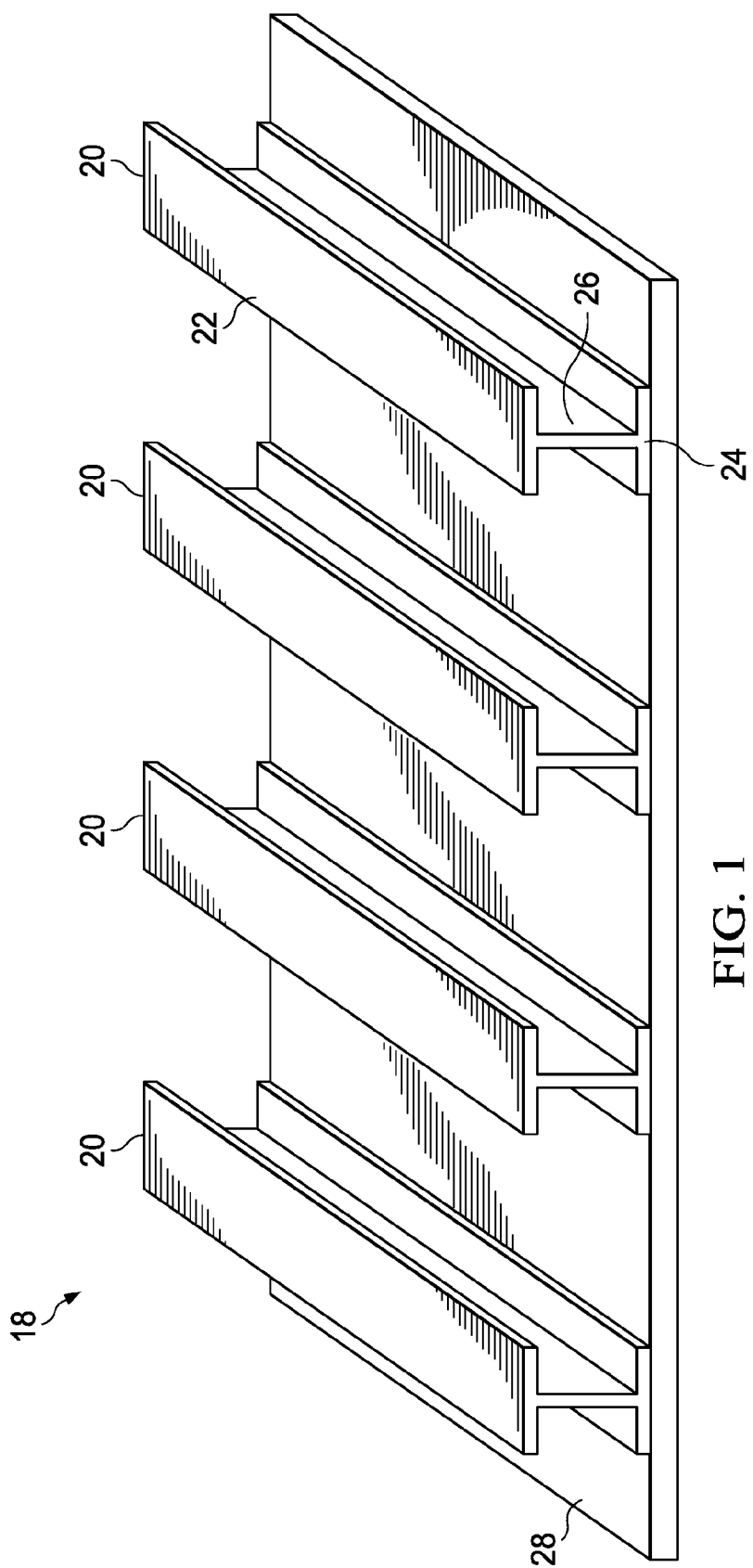
FIG. 1 is an illustration of a perspective view of a composite skin reinforced with co-bonded, composite stringers.

Referring to FIG. 1, the disclosed embodiments relate to vacuum bag processing of composite laminate parts, such as a composite skin 28 stiffened by composite stringers 20. The stringers 20 and the skin 28 are co-bonded using a bonding adhesive (not shown), however other joining techniques requiring vacuum bagging are possible, including those using autoclave or out-of-autoclave processes. In the illustrated embodiment, each of the stringers 20 has an "I" shaped cross-section, comprising upper and lower caps 22, 24 respectively, connected by a web 26. Other cross sectional stringer shapes are possible, including but not limited to "C", "Z", "L", "J" and "hat" shapes. The stringers 20 and composite skin 28 are merely illustrative of a wide range of composite parts having one or more contours that may be processed using a vacuum bag assembly according to the embodiments described below.

Figure 2:
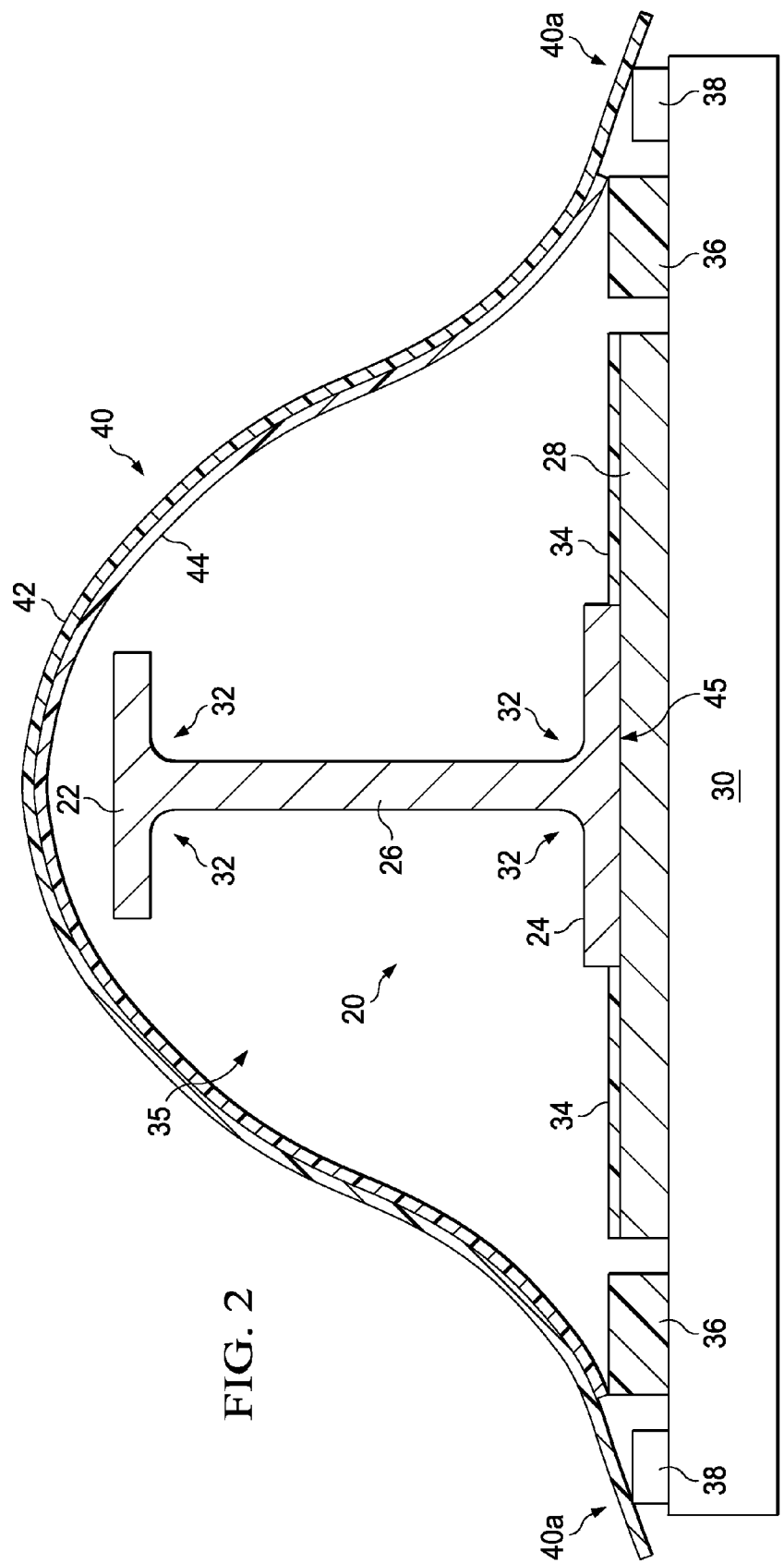
FIG. 2 is an illustration of a cross-sectional view of a co-bonded composite stringer and skin, a stretchable vacuum bag assembly having been initially draped over the stringer and skin in preparation for curing.

Attention is now directed to FIG. 2 which illustrates a part assembly 35 placed on a tool 30 in preparation for curing, which may include processing in an autoclave (not shown). The part assembly 35 comprises an I-shaped composite stringer 20 and a composite skin 28 bonded together by an adhesive along a bondline 45. The stringer 20 includes four inside radii 32 respectively located at the junctures between the caps 22, 24 and the web 26. A suitable release film 34 is placed on the skin 28 on both sides of the lower cap 24. An edge breather 36 is placed on the tool 30, surrounding the part assembly 35.

A conformable vacuum bag assembly 40 is initially draped over the part assembly 35, and is subsequently loosely fitted to the geometry of the part assembly 35 as will be later discussed in connection with FIG. 7. The vacuum bag assembly 40 comprises an outer, flexible, stretchable vacuum bag 42 attached to an inner, stretchable breather 44. The outer edges 40a of the vacuum bag 42 may extend beyond the breather 44 in order to permit the outer edges 40a to be sealed to the tool 30. The vacuum bag assembly 40 may be provided as a kit in which the vacuum bag 42 is pre-attached to the breather 44. Attachment of the vacuum bag 42 to the breather 44 facilitates the bagging process, and may save time in bagging parts. It should be noted here however, in other embodiments and applications thereof, it may be possible to use a stretchable vacuum bag 42 and a stretchable breather 44 that are not attached to each other, and that are separately installed over the parts 20, 28.

The vacuum bag 42 may be formed of any suitable material such as, without limitation, silicone or nylon. The breather 44 may comprise, for example and without limitation, a one-piece sheet of porous breather material capable of stretching and elongating. In one embodiment, the stretchable breather 44 may be capable of elongating at least approximately 50%. The vacuum bag 42 and the breather 44 may be substantially the same size and shape i.e. coextensive, except that the outer edges 40a of vacuum bag 42 may extend slightly beyond the breather 44. In other embodiments, however, the breather 44 may be formed of multiple pieces (not shown) of stretchable breather material, each of which is attached to the vacuum bag 42. As will be discussed below in more detail, the ability of the stretchable breather 44 to elongate during the cure process allows the breather 44 to stretch and be drawn down against contoured surfaces of the parts, and substantially reduces or eliminates breather bridging.

Both the vacuum bag 42 and the breather 44 may be relatively thin and light weight in order to enhance their ability to conform to contoured features of the part assembly 35, such as, for example, the inside radii 32. In an embodiment suitable for processing the part assembly 35 for example, the vacuum bag 42 and the breather 44 may each elongate during stretching thereof at least approximately 50%. The breather 44 may comprise, for example and without limitation, a non-woven, blended denier polyester fiber material. Typically, the vacuum bag 42 may be formed of materials such as a flexible nylon or flexible silicone, capable of elongating more than the breather 44.

In applications where the vacuum bag 42 is capable of stretching more than the breather 44, the degree to which the vacuum bag assembly 40 may stretch to conform to surface contours of the part may be limited by the ability of the breather 44 to stretch. The thicknesses and weight of each of the vacuum bag 42 and the breather 44, as well as their ability to stretch and elongate will depend upon the particular application. In one typical application, for example and without limitation, in which I-shaped composite stringers 20 were co-bonded with a composite skin 28, and vacuum bag processed within an autoclave during curing, suitable results were obtained using a nylon vacuum bag having a thickness of 3 mils (0.003 inches), and a one-piece nonwoven, polyester breather 44 having a weight of approximately 2 oz/yd$^2$ and capable of elongating at least approximately 50%.

Figure 3:
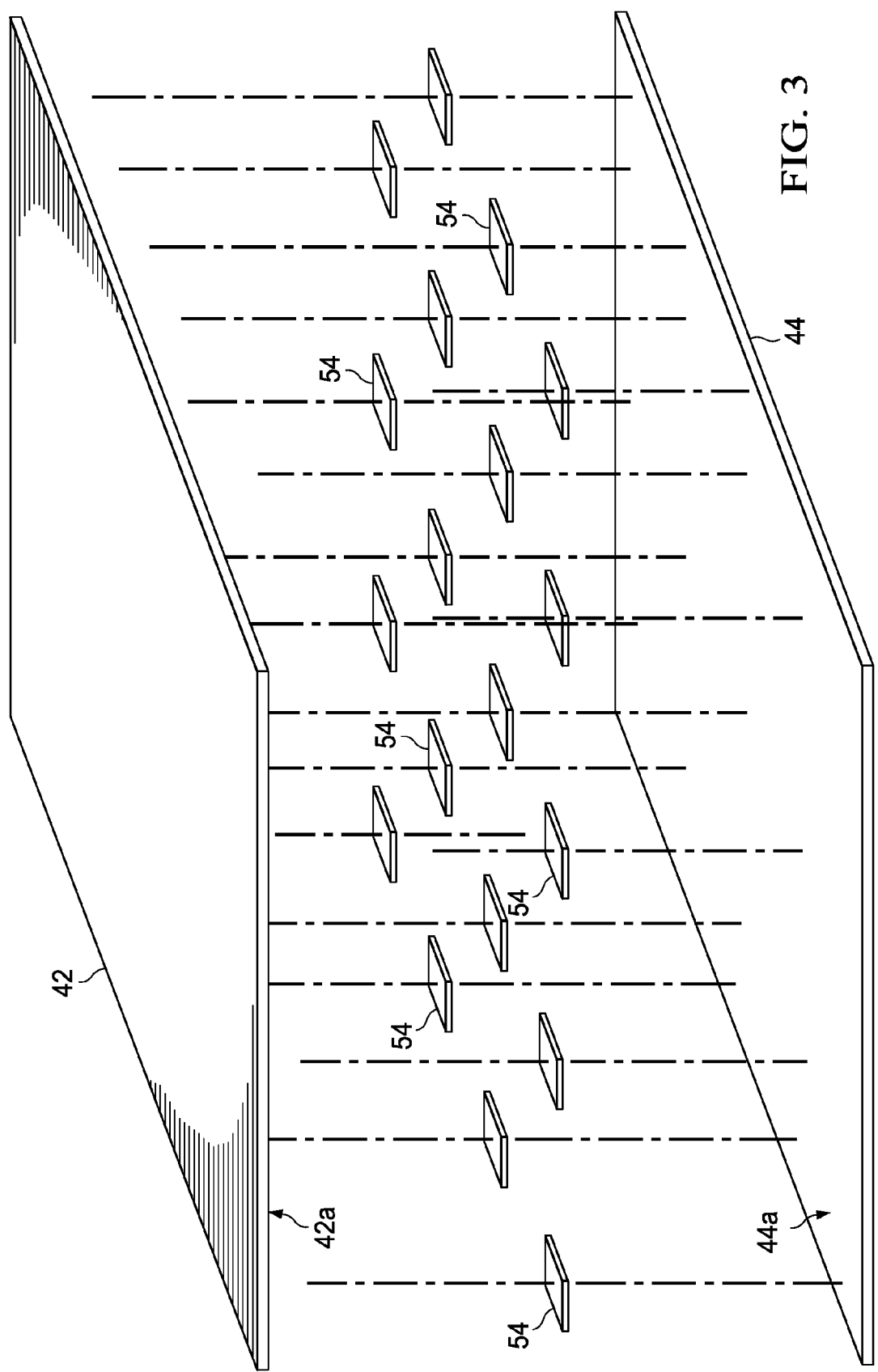
FIG. 3 is an illustration of an exploded view of one embodiment the stretchable vacuum bag assembly shown in FIG. 2.

Referring now to FIGS. 3, 4 and 4A, the vacuum bag 42 may be attached to the breather 44 by any suitable means, at spaced apart, selected locations along these surfaces 42a, 42b. However, in some embodiments, it may be possible to attach the vacuum bag 42 to the breather 44 substantially across their entire surfaces 42a, 42b. In the example shown in FIG. 3, the faying surfaces 42a, 44a are attached by stretchable adhesive patches 54 which may comprise any suitable stretchable adhesive, such as, without limitation, an elastic film 56 having layers of elastic adhesive 58, 60 on opposite sides thereof, sometimes referred to as double-backed adhesive tape. As best seen in FIG. 4, the adhesive patches may be arranged in a matrix-like, regular array, and may be spaced apart from each other a preselected distance. In other embodiments the adhesive patches 54 may not be regularly arranged, or evenly distributed, and may be spaced apart from each other at varying distances.

Figure 6:
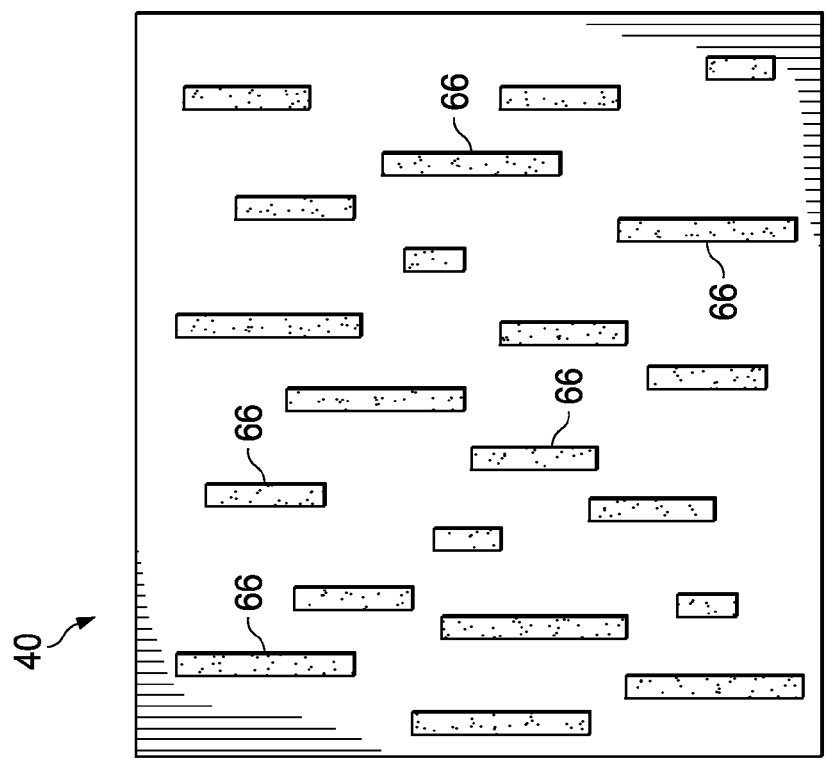
FIG. 6 is an illustration similar to FIG. 4 but showing a further embodiment of the stretchable vacuum bag assembly.
Figure 5:
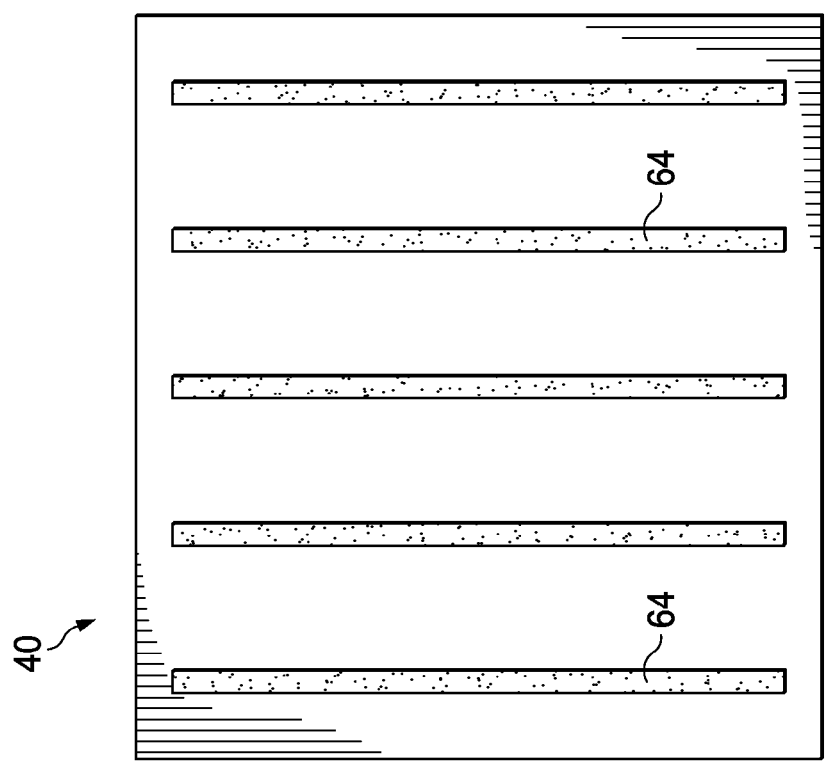
FIG. 5 is an illustration similar to FIG. 4 but showing an alternate embodiment of the stretchable vacuum bag assembly.

FIG. 5 illustrates another embodiment of the vacuum bag assembly 40 which the vacuum bag 42 and the breather 44 are attached by continuous adhesive strips 64 that are generally parallel and spaced apart from each other at regular distances. In still another embodiment shown in FIG. 6 the vacuum bag 42 may be attached to the breather 44 by discontinuous adhesive strips 66 that are irregularly arranged. A wide variety of other techniques, including but not limited to welding, may be used to attach or tack the vacuum bag 42 to the breather 44, depending on the application. Factors affecting the choice of attachment technique may include, without limitation, the size of the part to be covered, the thicknesses and weight of the vacuum bag 42 and the breather 44, and the materials from which the vacuum bag 42 and the breather 44 are manufactured.

It should be noted here that, for simplicity of illustration and description, FIGS. 3-6 show the vacuum bag 42 and the breather 44 as having the same size. In practical applications, however, the outer edges 40a (see FIG. 2) of the vacuum bag 42 will extend slightly beyond the breather 44 to allow the vacuum bag 42 to be sealed directly to the tool 30 by means of sealant tape 38 or other similar seal.

Referring now to FIGS. 7 and 7A, after the vacuum bag assembly 40 has been draped over the part assembly 35 as shown in FIG. 2, the vacuum bag assembly 40 is loosely fitted around the features of the part assembly 35, such as the caps 22, 24, the web 26 and the skin 28. This fitting process may be manually carried out by hand tailoring and pressing the vacuum bag assembly 40 down onto the part assembly 35.

Depending upon the application, however, it may be possible to use mechanisms or tools (not shown) to at least partially carry out the fitting process. In some applications, depending upon part geometry, the fitting process may result in the accumulation of excess vacuum bag assembly material. This excess material may be gathered together and formed into one or more pleats 52 at any location around the part assembly 35. It is not necessary to locate the pleats 52 at the inside radii 32. In the illustrated example, the pleats 52 have been formed along the webs 26. In other applications, it may not be necessary to form any pleats 52 in the vacuum bag assembly 40. In the areas of the part assembly 35 having certain surface contours, such as the inside radii 32, fitting of the vacuum bag assembly 40 may result in some degree of bridging 46 of the vacuum bag assembly 40 over these areas during the initial fitting process.

Once the vacuum bag assembly 40 has been loosely fitted over the part assembly 35 as described above, the outer edges 40a of the vacuum bag assembly 40 are sealed to the tool 30 by the seals 38 which may comprise conventional vacuum bag sealant tape, forming a vacuum chamber 33 surrounding the part assembly 35. The vacuum bagged part assembly 35 may then be placed in an autoclave (not shown), and the vacuum bag assembly 40 is coupled with a suitable vacuum source (not shown) which evacuates and draws a vacuum within the vacuum bag assembly 40. Heat and pressure are also applied to the part assembly 35 by the autoclave.

Figure 8:
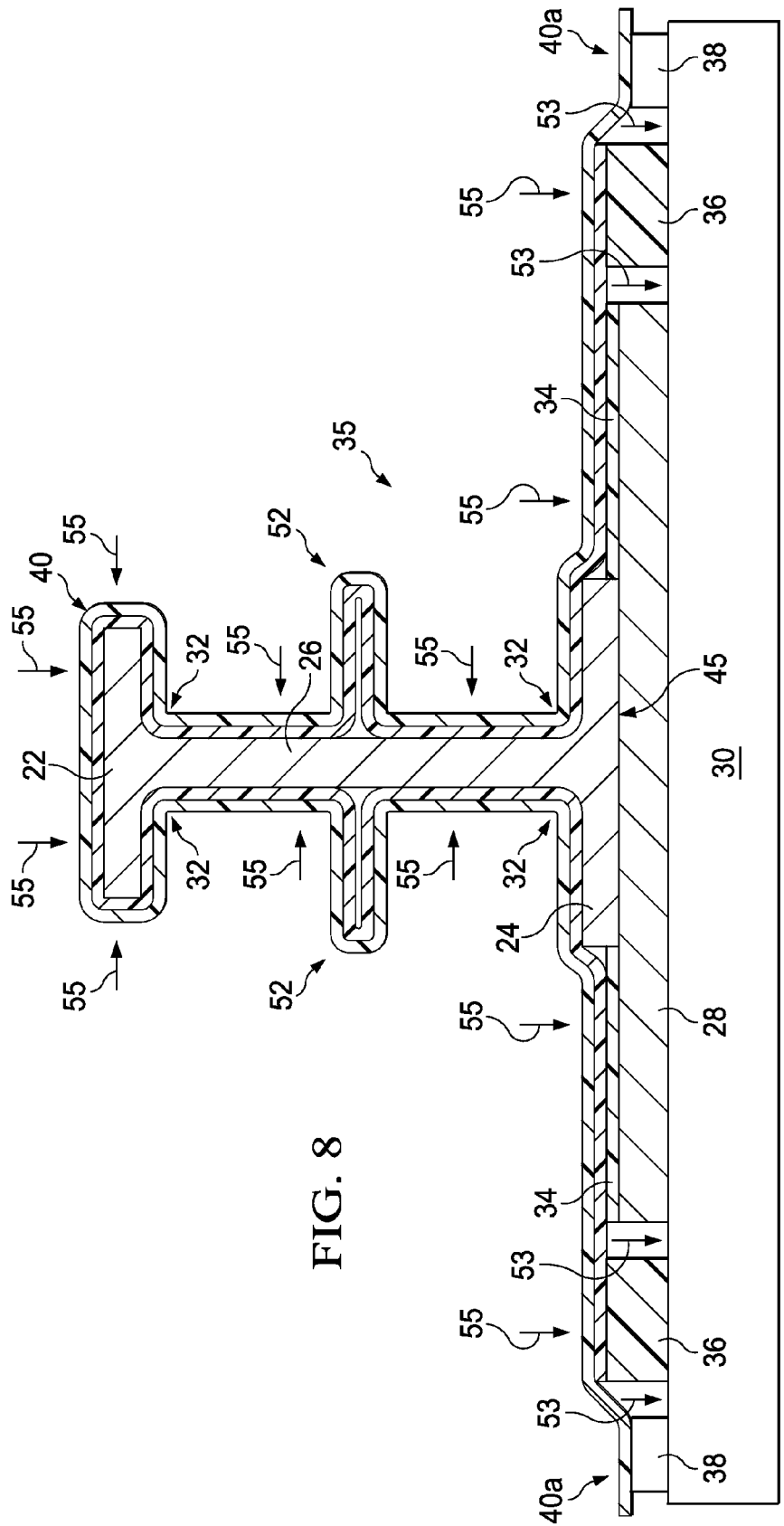
FIG. 8 is an illustration similar to FIG. 7, but showing the vacuum bag assembly having been stretched down onto the stringer and the skin.

Referring now particularly to FIGS. 7A and 8, external autoclave pressure 55 along with the internal vacuum pressure 53, draw the vacuum bag assembly 40 down against the heated part assembly 35, thereby compacting and compressing the laminate parts. Initially, internal vacuum pressure 53 within the vacuum bag 42 stretches and draws both the vacuum bag 42 and the breather 44 down against the part assembly 35, generally conforming to the geometry of the parts. The applied autoclave pressure 55 combined with the vacuum pressure 53 within the vacuum bag assembly 40 stretches 48 both the vacuum bag 42 and the breather 44 in the area of the inside radii 32, thereby simultaneously pushing and drawing the bridge portion 46 down into the inside radii 32 and against the part assembly 35. The vacuum bag 42 and the breather 44 stretch the same amount, and stretch substantially simultaneously as the vacuum bag assembly 40 is drawn down into the inside radii 32. In applications where the vacuum bag 42 is formed of a material that is capable of stretching more than the breather 44, the ability of the vacuum bag assembly 42 conform to surface contours of the part assembly 35, such as the inside radii 32, may be limited by the degree to which the breather 44 is able to stretch and elongate. The heat supplied by the autoclave softens both the vacuum bag 42 and the breather 44, enhancing their ability to stretch 48. Although the illustrated vacuum bagging method and vacuum bag assembly 40 have been described in an application using an autoclave, it is possible that they may be used to process composite parts using out-of-autoclave curing techniques.

Figure 9:
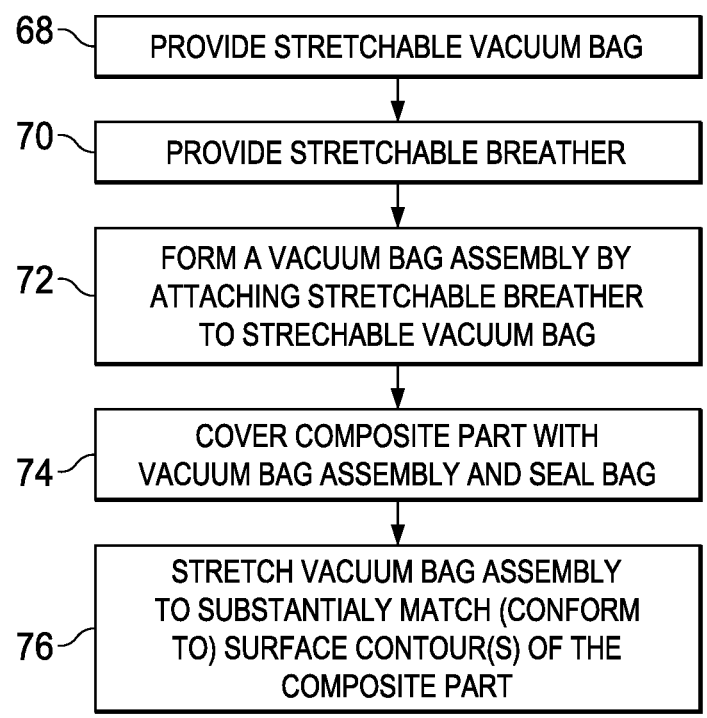
FIG. 9 is an illustration of a flow diagram of a vacuum bagging method employing a stretchable vacuum bag assembly.

FIG. 9 broadly illustrates the steps of a vacuum bagging method employing a stretchable vacuum bag assembly 40 of the type previously described. At step 68 a stretchable vacuum bag 42 is provided, and at step 70, a stretchable breather 44 is provided. Each of the vacuum bag 42 and the breather 44 may be cut to a desired size and shape from bulk materials. At 72, a vacuum bag assembly 40 is formed by attaching the stretchable breather 44 to the stretchable vacuum bag 42, as previously described, using any of various attachment techniques. At 74, one or more composite parts 20, 28 are covered by the vacuum bag assembly 40 which is then sealed, forming a vacuum bag chamber 33 around the parts 20, 28.

At step 76, the vacuum bag assembly 40 is stretched to substantially match surface contours of the composite parts 20, 28, e.g. inside radii 32. Stretching of the vacuum bag assembly 40, including stretching the breather 44, in this manner allows both the vacuum bag 42 and the breather 44 to conform to the surface contours of the composite parts 20, 28. This stretching is achieved using a combination of heat and internal vacuum pressure 53, aided by external autoclave pressure 55.

Embodiments of the disclosure may find use in a variety of potential applications, particularly in the transportation industry, including for example, aerospace, marine, automotive applications and other application where parts are processed using vacuum bagging to compress or consolidate the parts. Thus, referring now to FIGS. 10 and 11, embodiments of the disclosure may be used in the context of an aircraft manufacturing and service method 78 as shown in FIG. 10 and an aircraft 80 as shown in FIG. 11. Aircraft applications of the disclosed embodiments may include, for example, without limitation, curing a composite laminate part, or co-curing or co-bonding composite parts. For example, the disclosed embodiments may be utilized to vacuum bag process co-bond composite stringers with a composite skin. During pre-production, exemplary method 78 may include specification and design 82 of the aircraft 80 and material procurement 84. During production, component and subassembly manufacturing 86 and system integration 88 of the aircraft 80 takes place. Thereafter, the aircraft 80 may go through certification and delivery 80 in order to be placed in service 92. While in service by a customer, the aircraft 80 is scheduled for routine maintenance and service 94, which may also include modification, reconfiguration, refurbishment, and so on.

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 11, the aircraft 80 produced by exemplary method 78 may include an airframe 96 with a plurality of systems 98 and an interior 100. Examples of high-level systems 98 include one or more of a propulsion system 102, an electrical system 104, a hydraulic system 106 and an environmental system 108. Any number of other systems may be included. Although an aerospace example is shown, the principles of the disclosure may be applied to other industries, such as the marine and automotive industries.

Systems and methods embodied herein may be employed during any one or more of the stages of the production and service method 78. For example, components or subassemblies corresponding to production process 86 may be fabricated or manufactured in a manner similar to components or subassemblies produced while the aircraft 80 is in service. Also, one or more apparatus embodiments, method embodiments, or a combination thereof may be utilized during the production stages 86 and 88, for example, by substantially expediting assembly of or reducing the cost of an aircraft 80. Similarly, one or more of apparatus embodiments, method embodiments, or a combination thereof may be utilized while the aircraft 80 is in service, for example and without limitation, to maintenance and service 94.

As used herein, the phrase "at least one of", when used with a list of items, means different combinations of one or more of the listed items may be used and only one of each item in the list may be needed. For example, "at least one of item A, item B, and item C" may include, without limitation, item A, item A and item B, or item B. This example also may include item A, item B, and item C or item B and item C. The item may be a particular object, thing, or a category. In other words, at least one of means any combination items and number of items may be used from the list but not all of the items in the list are required.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different advantages as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of vacuum bag processing a composite part having at least one contour, comprising:
    forming a vacuum bag assembly by attaching a stretchable breather to a stretchable vacuum bag, wherein attaching the stretchable breather to the stretchable vacuum bag is performed by placing double-backed adhesive tape between the stretchable breather and the vacuum bag;
    sealing the vacuum bag assembly over the composite part; and
    stretching the vacuum bag assembly to substantially match the contour of the composite part; and
    wherein attaching the stretchable breather to the vacuum bag includes attaching the stretchable breather to the vacuum bag at irregularly spaced apart locations over the vacuum bag assembly.

2. The method of claim 1, wherein stretching the vacuum bag assembly includes:
    stretching the vacuum bag, and
    stretching the stretchable breather.

3. The method of claim 2, wherein stretching the vacuum bag and stretching the stretchable breather are performed substantially simultaneously.

4. The method of claim 2, wherein stretching the breather includes stretching the vacuum bag substantially a same amount that the stretchable breather is stretched.

5. The method of claim 1, wherein stretching the vacuum bag assembly is performed by:
drawing a vacuum in the vacuum bag, and
using the vacuum bag to stretch the stretchable breather.

6. The method of claim 5, wherein stretching the vacuum bag assembly includes using autoclave pressure to stretch the vacuum bag against the stretchable breather.

7. The method of claim 1, further comprising:
forming at least one pleat the vacuum bag assembly.

8. A method of autoclave curing a composite laminate part having at least one inside radius surface, comprising:
placing a stretchable breather over the composite laminate part;
placing a stretchable vacuum bag over the stretchable breather;
attaching the stretchable breather to the vacuum bag before the vacuum bag is sealed over the composite laminate part, wherein attaching the stretchable breather to the vacuum bag is performed by placing adhesive strips between the stretchable breather and the vacuum bag;
sealing the stretchable vacuum bag over the composite laminate part; and
stretching the stretchable breather down against and conforming to the inside radius surface;
wherein attaching the stretchable breather to the vacuum bag includes attaching the stretchable breather to the vacuum bag at irregularly spaced apart locations over a vacuum bag assembly.

9. The method of claim 8, wherein placing the stretchable breather includes covering substantially the entire composite laminate part with a single sheet of breather material.

10. The method of claim 8, further comprising forming at least one pleat in the combination of the stretchable breather and the vacuum bag at a location other than at the at least one inside radius surface.

11. The method of claim 8, wherein sealing the vacuum bag is performed by sealing the vacuum bag to a tool on which the composite laminate part is supported.

12. The method of claim 8, wherein stretching the stretchable breather is performed by:
evacuating the vacuum bag, and
applying autoclave pressure to the vacuum bag.

13. A method of vacuum bagging a part having a contour, comprising:
combining a stretchable vacuum bag with a stretchable breather, wherein combining the vacuum bag with the stretchable breather is performed by attaching the vacuum bag to the stretchable breather by placing strips of double-backed adhesive tape between the vacuum bag and the stretchable breather; and
stretching the combination of the stretchable vacuum bag and the stretchable breather to substantially match the contour of the part;
wherein attaching the vacuum bag to the stretchable breather includes attaching the stretchable breather to the vacuum bag at irregularly spaced apart locations over a vacuum bag assembly.

14. The method of claim 13, wherein the stretching is performed by:
drawing a vacuum in the vacuum bag, and
applying autoclave pressure to the vacuum bag.

15. A vacuum bag assembly, comprising:
a stretchable vacuum bag; and
a stretchable breather attached to the stretchable vacuum bag;
wherein attaching the stretchable breather to the stretchable vacuum bag is performed by placing double-backed adhesive tape between the stretchable breather and the vacuum bag; and
wherein attaching the stretchable vacuum bag to the stretchable breather includes attaching the stretchable breather to the stretchable vacuum bag at irregularly spaced apart locations over the vacuum bag assembly.

16. The vacuum bag assembly of claim 15, wherein the stretchable breather is substantially a single piece of breather material and is substantially coextensive with the vacuum bag.

17. The vacuum bag assembly of claim 15, wherein the stretchable breather is attached to the vacuum bag by an adhesive.

18. The vacuum bag assembly of claim 15, wherein the stretchable breather is a relatively light weight, nonwoven material.

19. The vacuum bag assembly of claim 18, wherein the nonwoven material is a polyester.

20. The vacuum bag assembly of claim 15, wherein the stretchable breather is capable of elongation of at least approximately 50%.

21. The vacuum bag assembly of claim 15, wherein the stretchable breather is porous.

* * * * *

UNITED STATES PATENT AND TRADEMARK OFFICE
CERTIFICATE OF CORRECTION

PATENT NO. : 9,707,705 B2
APPLICATION NO. : 13/933368
DATED : July 18, 2017
INVENTOR(S) : Michael K. Louie et al.

Page 1 of 1

It is certified that error appears in the above-identified patent and that said Letters Patent is hereby corrected as shown below:

On the Title Page

Abstract, Line 1, change "the" to --a--.

In the Claims

Column 8, Line 64, insert --stretchable-- after "the" second occurrence.
Column 9, Line 9, after "in" insert --the--.

Signed and Sealed this
Twenty-fourth Day of October, 2017

Joseph Matal
*Performing the Functions and Duties of the*
*Under Secretary of Commerce for Intellectual Property and*
*Director of the United States Patent and Trademark Office*